Oct. 15, 1957          J. S. SIMS, JR., ET AL          2,809,714
DE-ICER FOR WATER SEPARATOR CONTROLLED BY PRESSURE DROP
Filed Feb. 17, 1955

INVENTORS
THOMAS P. FARKAS
JAMES S. SIMS JR.
BY Harris G. Luther
ATTORNEY

United States Patent Office 2,809,714
Patented Oct. 15, 1957

2,809,714

DE-ICER FOR WATER SEPARATOR CONTROLLED BY PRESSURE DROP

James S. Sims, Jr., Granby, and Thomas P. Farkas, Bloomfield, Conn., assignors to United Aircraft Corporation, East Hartford, Conn., a corporation of Delaware Application February 17, 1955, Serial No. 488,833

15 Claims. (Cl. 183—33)

This invention relates to a water separator and particularly to a de-icing control for a water separator.

An object of this invention is a device responsive to an effect of icing of a water separator for controlling de-icing mechanism.

A further object is mechanism responsive to a pressure drop across a frozen portion of a water separator for introducing heat to the separator.

A further object is mechanism insensitive to changes in pressure due to changes in inlet or outlet pressure of a water separator but sensitive to changes in pressure due to icing of a portion of the separator for controlling the introduction of heated air for melting the ice.

Other and additional objects will be apparent from the following specification and the attached drawings in which.

Figure 1:
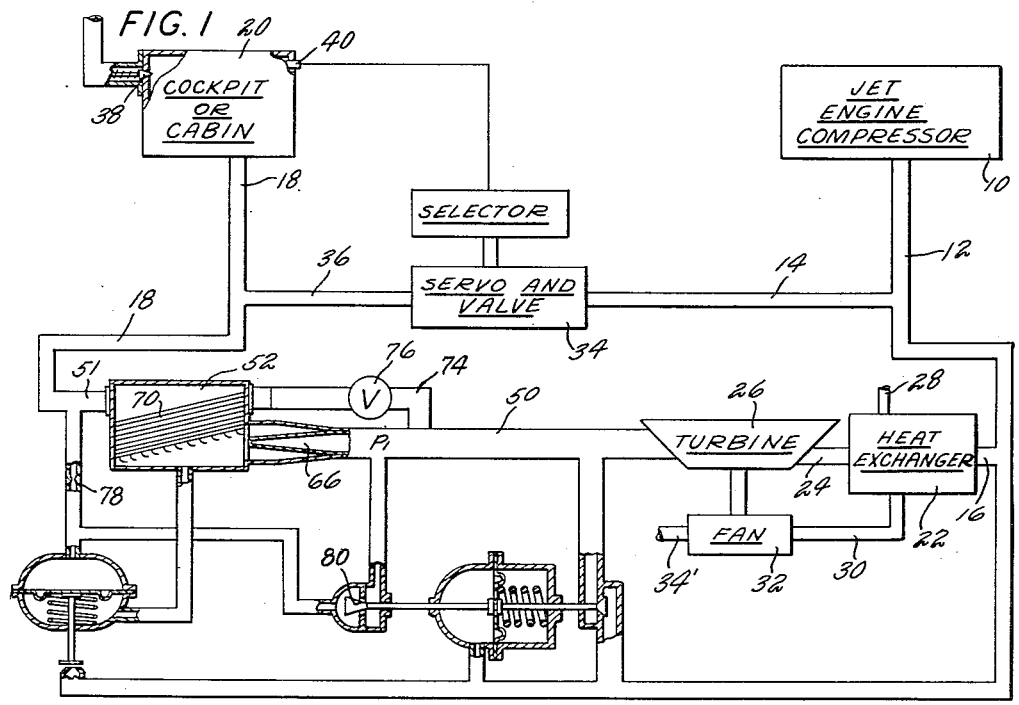
Fig. 1 is a schematic drawing showing the general arrangement of an airplane air conditioning system including a de-icing mechanism.

The design of an air conditioning system for the present-day aircraft entails the consideration of several factors which vary with changes in flight operation and which dictate the requirements of the system. For example, during ground operation and at low level flight the system may be required to deliver a cooling air stream to the aircraft cabin or cockpit to provide comfortable conditions for the occupants thereof. At moderate altitudes the system may be required to deliver a warm air stream and during high-altitude, high-speed operation the system will probably be called upon for a cold air supply.

In the past, various systems have been developed to utilize a compressed air source, such as a bleed from the compressor of a turbine, and to supply air at the various temperatures required for cabin comfort. In such systems some of the hot compressed air is cooled by conventional means to provide cold air cabin supply and some of the hot compressed air is utilized to supply a hot air supply. The hot and cold air supply are mixed in varying proportions and led to the cabin or cockpit to obtain the desired cabin air temperature.

The systems may also be adapted in accordance with conventional practices to maintain a selected cabin pressure. Since the present invention relates primarily to improvements in the air temperature control system, pressure control will be only briefly referred to.

The present invention may be briefly described as embracing improvements in the control of the water content of air being delivered to an airplane compartment. It has been found that under some conditions air fed to an airplane compartment contains sufficient moisture to cause fog, rain or snow in the airplane compartment. In order to eliminate this feature, a water separator is inserted into cold air discharge from the cooling turbine to remove the free moisture from the cooled air, thus reduce the moisture contents of the mixed air fed to the cabin to such an extent that the dew point will be below the cabin temperature. Because the ability of air to hold moisture is proportional to temperature of the air, air at turbine discharge temperature which is considerably lower than ambient temperature is, for at least some operating conditions, in a state of super saturation. By removing the free moisture from this cooled air, although its relative humidity will not be reduced to below 100%, the mixture of this cold air and the warm air fed to the compartment will, because the temperature of the mixture is higher than the cold air, have a relative humidity below 100% and fogging will thus be prevented.

Referring to the drawings, the specific embodiment chosen to illustrate the invention for purposes of explanation, but not limitation, comprises a source of compressed air which may be the compressor 10 of a jet or turbine engine. Hot air from this compressor 10 is led through line 12 and through two parallel lines 14 and 16 to the cabin inlet conduit 18. Air which is discharged from the compressor 10 to the conduit 16 is cooled to provide the previously mentioned cold air supply for the compartment 20 and the air which is discharged to the conduit 14 by-passes the cooling system and provides the hot air supply for the cabin which is mixed with the cold air supply to provide a supply of selected temperature.

With specific reference to the cold air supply, it will be noted that air in conduit 16 is passed through a heat exchanger 22 to give up a major portion of its heat and is then passed through conduit 24 to drive a turbine 26 which will remove energy from the air stream air and, in so doing, further reduce the air temperature. The cooled air is fed from the turbine 26 to the conduit 50 and through a water separator 52 to the cabin inlet conduit 18. The cooling air for the heat exchanger is introduced through a line 28 which may be supplied with ram air. After passing through the heat exchanger 22, the cooling air is led through conduit 30 and a fan 32 driven by the turbine 26, and is then discharged overboard through a conduit 34'. The fan 32 provides a load for the turbine 26, permitting the turbine to extract energy from the air passing through the turbine.

The hot air supply fed through by-pass 14 is controlled by a valve 34 and is then led through a conduit 36 to the cabin air inlet conduit 18. The hot air supply from the conduit 36 and the cold air supply from the water separator 52 are mixed in the cabin air inlet conduit 18 before introduction to the cabin 20. The proportion of the mixture is controlled by valve mechanism 34 which is automatically operable in response to temperature responsive means 40 in the cabin 20.

The system has been described without consideration of the pressure requirements for various altitudes and varying conditions of flight operations. For purposes of simplicity, it may be assumed that the system will deliver air to the cabin under pressure sufficient for all flight conditions and a pressure responsive cabin ventilator or relief valve 38 is arranged to maintain cabin pressure at a desired or selected level. As this application is directed primarily to the water separator, it is believed unnecessary to supply further details of the cabin air supply. Reference may be made however to application Serial No. 471,152 of Sims and Farkas for Cabin Temperature Control System for further details of the system.

The water separator shown schematically in application Serial Number 488,822 of McGuff and Reinhardt, for Moisture Separator and filed on even date herewith, to which reference may be made for further details, comprises two water collecting screens including a coalescer 66 and a collector 70 arranged in series in an air duct 50, 51 and having a valve 76 which may be actuated by ambient pressure arranged in a by-pass conduit 74 around the water separator.

The air discharge from the turbine 26 at some conditions of operations will be below freezing temperature. At these temperatures, the water, snow, or ice impinging on the coalescer may freeze and tend to block the coalescer 66 and prevent the passage of air therethrough.

The restricted or blocked coalescer 66 of the water separator 52 will cause an increased pressure drop across the coalescer. This pressure drop is utilized by the mechanism about to be described to bleed hot air from the compressor 10 directly into the outlet of the turbine 26 to thereby raise the temperature of the air entering the water separator so that no more ice or snow accumulates, or so that the ice or snow melts.

As the water separator is subject to variations in flow due to variations in inlet pressure, outlet pressure, or both, which in itself would produce a variation in pressure drop across the coalescer 66, it is necessary to provide a mechanism which will be responsive only to variations in pressure drop due to icing, and the blocking of the coalescer, alone.

Figure 2:
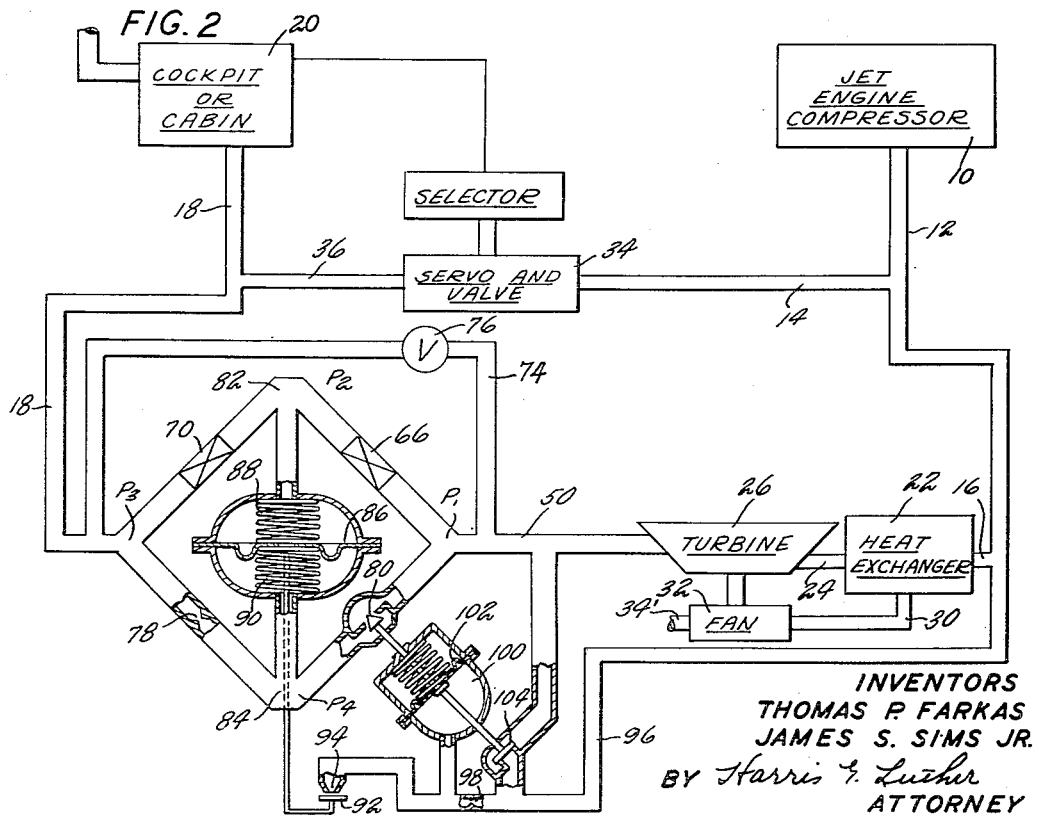
Fig. 2 is a schematic view of a water separator and a de-icing control arranged to more clearly show the Wheatstone bridge arrangement.

In order to do this, a form of Wheatstone bridge is utilized, the drop across the coalescer 66 forming one leg and the drop across the collector 70 forming another leg and completing one side of the Wheatstone bridge. The other side is formed by a by-pass across the water separator and has a restriction 78 in one portion of the line forming the third leg of the Wheatstone bridge and has a variable restriction 80 in another portion of the line forming the fourth leg of the Wheatstone bridge. As shown in Fig. 2, the parallel paths are provided with a variable resistance in one path so that the pressures P2 and P4 at the mid-points 82 and 84 of the paths can be made equal. Any variation in flow caused by a variation of the pressure P1 in line 50 and P3 in line 18 will vary both pressures P2 and P4 equally so that the pressures will remain equal. However, if the pressure drop across the coalescer 66 should change without a proportional change in the pressure drop through collector 70, then the pressure at P2 and P4 would no longer be equal. It is this variation in the pressure which is utilized to control the introduction of hot air to the turbine discharge.

The portion 82 of the line through the water separator is connected to one side of a pressure responsive diaphragm 86, the other side of which is connected to the midportion 84 of the restricted by-pass around the water separator. The diaphragm 86 is centered by means of springs 88 and 90. Diaphragm 86 controls a valve 92 regulating the outlet of a nozzle 94 in a line 96 having a restriction 98. The position of the valve 92 will therefore control the pressure in a chamber 100 connected with the line 96 between the nozzle 94 and the restriction 98. A diaphragm 102 closing one side of the chamber 100 is connected with a valve 80 controlling the variable restriction in the by-pass around the water separator and also with a valve 104 controlling the connection between the compressor hot air line 12 and the turbine discharge 50. When the pressures P2 and P4 are equal, valve 92 will be open and the valve 104 will be closed, and the valve 80 will be positioned so as to make the pressure P4 equal to the pressure P2 which is done by adjusting the position of valve 80, by adjusting means not shown.

As the coalescer 66 ices up and the pressure drop across the coalescer increases, pressure at P2 will become less than the pressure at P4. Diaphragm 86 will thereupon be moved upwardly to close the valve 92 and increase the pressure in chamber 100 which will close valve 80 to increase the restriction across the valve in an attempt to again balance the pressures P2 and P4. However, balancing of the pressures P2 and P4 would again open valve 92 and restore valve 80 to its original position. Before the valve can open to its original position, the pressure difference between P2 and P4 would again tend to close the valve so that an intermediate position is reached where the pressures at P2 and P4 are not quite equal and the pressure drop across the valve 80 is a little greater than the pressure drop across the frozen coalescer 66 so that valve 104 will remain open to supply hot air to the line 50 as long as the coalescer is blocked by ice. As soon as the coalescer becomes unblocked, pressure P2 will be restored, valve 92 will be opened and valve 80 thus opened to restore the pressure P4.

Thus the addition of deicing hot air will occur only when the coalescer is blocked and hot air will not be introduced to the water separator intake when there is no necessity for heating at this point.

In actual operation as the coalescer 66 is partially obstructed by the formation of ice, a pressure difference will be developed between points 82 and 84 which will actuate valve 80 and 104 to introduce hot air. The system is so proportioned however that this hot air introduction is not generally cycling but will supply sufficient hot air to arrest the freezing action and arrive at a balanced or equilibrium condition in which the coalescer may be partially obstructed and hot air is continuously introduced to prevent any further obstruction. There will then be a pressure difference between P2 and P4 at points 82 and 84 sufficient to continuously supply the correct quantity of hot air to maintain the balance, the hot air being regulated in proportion to the severity of the icing conditions. Of course, as the icing conditions disappear, as may be occasioned by a reduction in the water content of the air or an increase in the turbine output temperature, the coalescer may become completely unblocked and the pressures P2 and P4 again be equalized.

It is to be understood that the invention is not limited to the specific embodiment herein illustrated and described, and may be used in other ways without departure from its spirit as defined by the following claims.

I claim:

1. In combination with a separator having an air entrance and an air exit and means therebetween for separating water from an air stream passing therethrough, said separating means including means producing a pressure drop across an upstream portion of the separator, a de-icing control comprising means providing the separator entrance with a source of heated air and means insensitive to pressure changes at the air exit and responsive to a change in said pressure drop due to icing of said separator portion for controlling the introduction of heated air to said entrance.

2. In combination with a water separator having a cooled air entrance and an air exit and two separate water collecting screens, one arranged upstream of the other and with the upstream subject to icing, de-icing means comprising means controlling the introduction of heated air to said air entrance, including a valve, pressure sensitive mechanism responsive to a change in the pressure drop across the upstream screen due to icing for actuating said valve to introduce heated air.

3. A combination as claimed in claim 2 having a by-pass with two spaced restrictions, around said separator said pressure sensitive mechanism having one side subject to the pressure between said screens and the other side subject to the pressure between said restrictions, and operatively connected with the upstream one of said restrictions to vary the same and also operatively connected with said valve.

4. In combination with a device subject to icing and having a parameter of operation variable in proportion to the extent of icing, a balance circuit arranged in simulation of a Wheatstone bridge having said device in one leg of one branch of the bridge, said device causing an unbalance of said bridge in proportion to the extent of icing, a mechanism having a similar parameter of operation forming the corresponding leg of the other branch of the bridge, means for supplying a de-icing medium to said device, control means for said supplying means, means responsive to the unbalance of said bridge operatively connected with said mechanism for varying the parameter of operation of said mechanism in a direction toward restoring the balance of said bridge, said means also operatively connected with said control means for said medium supplying means to supply said medium in proportion to said unbalance.

5. The combination as claimed in claim 4 in which the device is a screen of a water separator of an airplane air conditioning system and the mechanism is a restriction in a by-pass around the separator.

6. The combination as claimed in claim 5 in which the parameter of operation of said device is the pressure drop across the screen and the similar parameter of operation of said mechanism is the pressure drop across the restriction.

7. The combination as claimed in claim 6 in which the mechanism includes a variable restriction and the means for varying the parameter of operation of said mechanism includes means for varying said restriction.

8. The combination as claimed in claim 4 in which the means for supplying a de-icing medium includes a conduit for supplying heated air.

9. The combination as claimed in claim 8 in which the control means includes a valve in said conduit.

10. The combination as claimed in claim 9 in which the device is a screen of a water separator of an airplane air conditioning system and the mechanism is a restriction in a by-pass around the separator.

11. The combination as claimed in claim 10 in which the parameter of operation of the device is the pressure drop across the screen.

12. The combination as claimed in claim 11 in which the restriction is a variable restriction, the means for varying the parameter of operation of said mechanism is valve means for varying said restriction and the similar parameter of operation of said mechanism is the pressure drop across said variable restriction.

13. A de-icing control for a water separator having an air entrance and an air exit and having spaced air flow restrictions including a coalescer and a collector, means connected with both the air exit and the air entrance and including pressure responsive mechanism connected with the space between said restrictions and responsive to pressure changes in said space due to changes in the restriction of said coalescer, said means including means rendering said mechanism insensitive to pressure changes in said space due to pressure changes in said entrance or exit and means responsive to actuation of said mechanism for changing the condition of said air at said entrance.

14. A de-icing control for a water separator having an air entrance and an air exit and having spaced air flow restrictions including a coalescer and a collector arranged in series between said entrance and said exit, a by-pass around said separator having spaced restrictions arranged in series between said entrance and said exit, the upstream by-pass restriction being adjustable, pressure responsive mechanism connected with the space between said separator restrictions and also having a connection intermediate the by-pass restrictions, means operatively connected with said mechanism for increasing the restriction of said adjustable restriction and introducing heated air to said entrance upon an increase in the restriction of said coalescer due to icing.

15. A control as claimed in claim 14 in which said pressure responsive mechanism includes a motor having one side subject to the pressure of said space and the opposite side subject to the pressure intermediate said by-pass restrictions for actuating said motor by the differences in said pressures.

References Cited in the file of this patent

UNITED STATES PATENTS

| | | |
|---|---|---|
| 2,334,561 | Kopplin | Nov. 16, 1943 |
| 2,382,365 | Carssow | Aug. 14, 1945 |
| 2,388,028 | Barber | Oct. 30, 1945 |
| 2,585,570 | Messinger | Feb. 12, 1952 |
| 2,661,076 | Walker | Dec. 1, 1953 |